United States Patent [19]

Matsunaga et al.

[11] Patent Number: 4,803,560
[45] Date of Patent: Feb. 7, 1989

[54] LIQUID-CRYSTAL TELEVISION RECEIVER WITH CASSETTE TAPE RECORDER

[75] Inventors: Tsuyoshi Matsunaga; Hideaki Shimizu, both of Tokyo, Japan

[73] Assignee: Casio Computer Co., Ltd., Tokyo, Japan

[21] Appl. No.: 12,721

[22] Filed: Feb. 9, 1987

[30] Foreign Application Priority Data

Feb. 21, 1986 [JP] Japan ................................ 61-22955[U]
Mar. 31, 1986 [JP] Japan ................................ 61-46283[U]
Dec. 24, 1986 [JP] Japan ................................ 61-197321[U]

[51] Int. Cl.$^4$ ............................................. H04N 5/64
[52] U.S. Cl. .................................... 358/236; 358/254
[58] Field of Search ....................... 358/236, 254, 231

[56] References Cited

U.S. PATENT DOCUMENTS 4,561,044 12/1985 Ogura ................................... 358/236
4,646,158 2/1987 Ohno .................................... 358/236

FOREIGN PATENT DOCUMENTS 59-90201 5/1984 Japan ................................... 358/236
59-178082 10/1984 Japan .

OTHER PUBLICATIONS

Sharp TV-Cassette, Catalog from DAK Industries Incorp., received Mar., 1988.

*Primary Examiner*—Tommy P. Chin
*Attorney, Agent, or Firm*—Frishauf, Holtz, Goodman & Woodward

[57] ABSTRACT

An apparatus combining a liquid-crystal television receiver and a portable cassette tape recorder wherein a reflection mirror is pivotally arranged on an apparatus main body which has a cassette loading section and incorporating a cassette tape driving mechanism, and a liquid-crystal display device for displaying a television image is pivotally arranged on the reflection mirror. The television image displayed on the liquid-crystal display device is reflected by the reflection mirror and is watched.

12 Claims, 7 Drawing Sheets

LIQUID-CRYSTAL TELEVISION RECEIVER WITH CASSETTE TAPE RECORDER

BACKGROUND OF THE INVENTION

A liquid-crystal television receiver which uses a liquid-crystal display device instead of a cathode-ray tube is recently commercially available. Such a liquid-crystal television receiver can reduce the size of a television as a whole. Therefore, the receiver can be combined with other equipment, and different functions can be realized by single equipment. As particularly effective composite equipment, a cassette tape recorder can be considered. A known apparatus combining a liquid-crystal television receiver and a cassette tape recorder is described in Japanese Patent Disclosure No. 59-178082. However, this Japanese patent disclosure describes how the different functions can be executed, but does not described how to construct a liquid-crystal television receiver and a cassette tape recorder when both are combined. Japanese Patent Disclosure No. 59-90201 is also known. The gist of this Japanese patent disclosure is that a liquid-crystal display member is arranged in a lid portion of a cassette tape recorder for loading a cassette tape. More specifically, a cassette loading portion and the liquid-crystal display member are arranged at positions to overlap each other, thereby improving a space factor.

However, in Japanese Patent Disclosure No. 59-90201, the liquid-crystal display member is simply arranged in the cassette loading lid portion, and no means for making a display image easy to see is arranged. More specifically, since a liquid-crystal display device uses a light-receiving type display element, display is not allowed under an insufficient amount of light. In addition, since the liquid-crystal display device has a field angle, it can be watched only from one direction. Therefore, if the liquid-crystal display member is simply installed in the cassette tape loading portion, a display image is dark, and a bright place must be selected to watch the display. Therefore, a clear image cannot be obtained. If the liquid-crystal display member is arranged on the identical plane as the surface of the cassette tape recorder as in Japanese Patent Disclosure No. 59-90201, a display screen is fixed as low as the surface unique to the main body. Therefore, the screen does not allow easy watching due to the field angle.

SUMMARY OF THE INVENTION

The present invention has been made in consideration of the above situation and has as its object to provide a liquid-crystal television receiver which is combined with a cassette tape recorder and which effectively utilizes a mechanism unique to the cassette tape recorder, can provide a sufficiently bright liquid-crystal display screen, and has good field of view characteristics.

In order to achieve the above object, the liquid-crystal television receiver of the present invention comprises a main body incorporating a cassette tape driving mechanism and having a cassette loading section; a television reception circuit means for receiving a television signal; a first member having an optical means; and a second member having a transmission type liquid-crystal display means for displaying, in cooperation with the optical means of the first member, a television image corresponding to the television signal received by the television reception circuit means.

According to a specific embodiment to the present invention, a lid member for loading a cassette tape has a two-stage structure. An image displayed on a liquid-crystal display panel incorporated in a lid member of the second stage is reflected by a mirror surface of a reflection mirror arranged on a back surface of a lid member of the first stage. External light is radiated obliquely downward with respect to the liquid-crystal display panel, and is transmitted through the panel to display the image on the mirror surface. Therefore, a sufficient amount of light can be supplied to the liquid-crystal display panel, and a bright display image can be obtained. The liquid-crystal display panel can be arranged at an easy to see angle with respect to the reflection mirror. Therefore, a display screen allows easy watching. The cassette tape loading lid member and the liquid-crystal display panel are arranged on the same plane. Thus, the effect of saving and effectively utilizing a space can also be obtained.

DETAILED DESCRIPTION OF THE PREFERRED EMBODIMENTS

Preferred embodiments of the present invention will be described with reference to the accompanying drawings.

Figure 1:
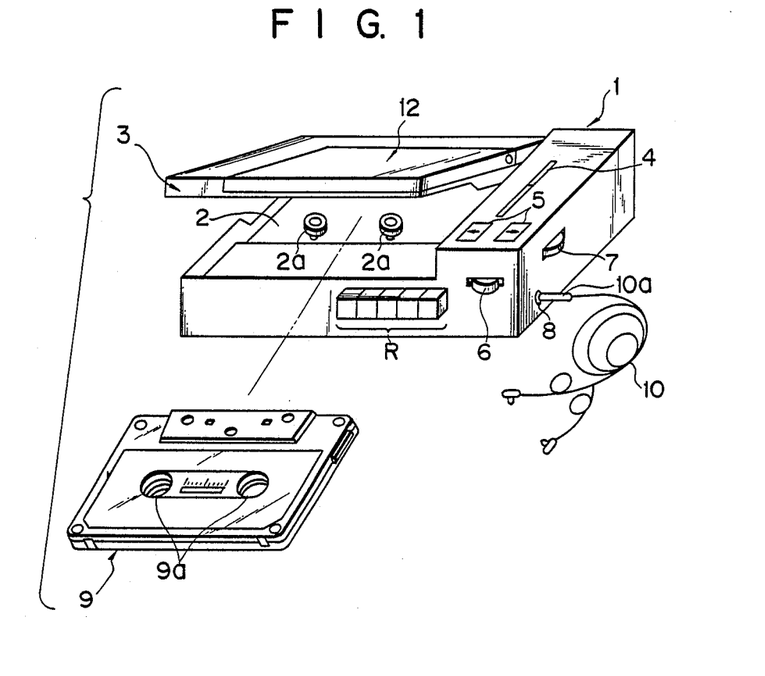
FIG. 1 is a perspective view showing a state wherein a liquid-crystal television receiver according to a first embodiment of the present invention is used as a cassette tape recorder.
Figure 2:
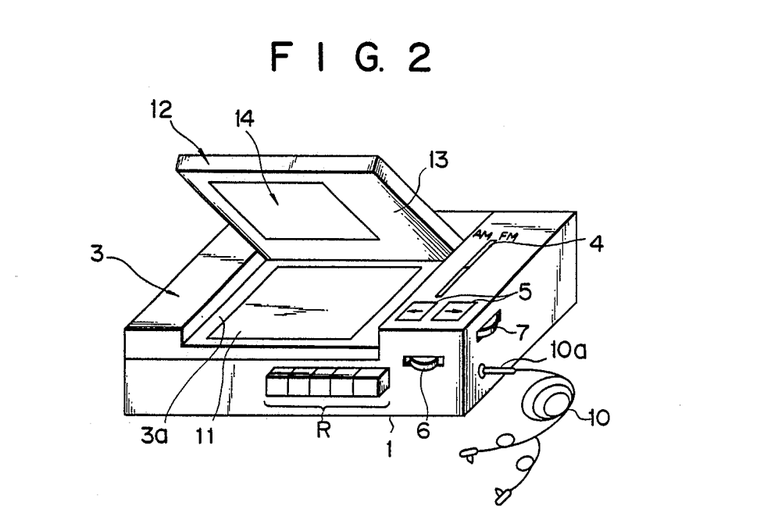
FIG. 2 is a perspective view showing a state wherein the first embodiment is used as a liquid-crystal television receiver in place of the tape recorder.
Figure 3:
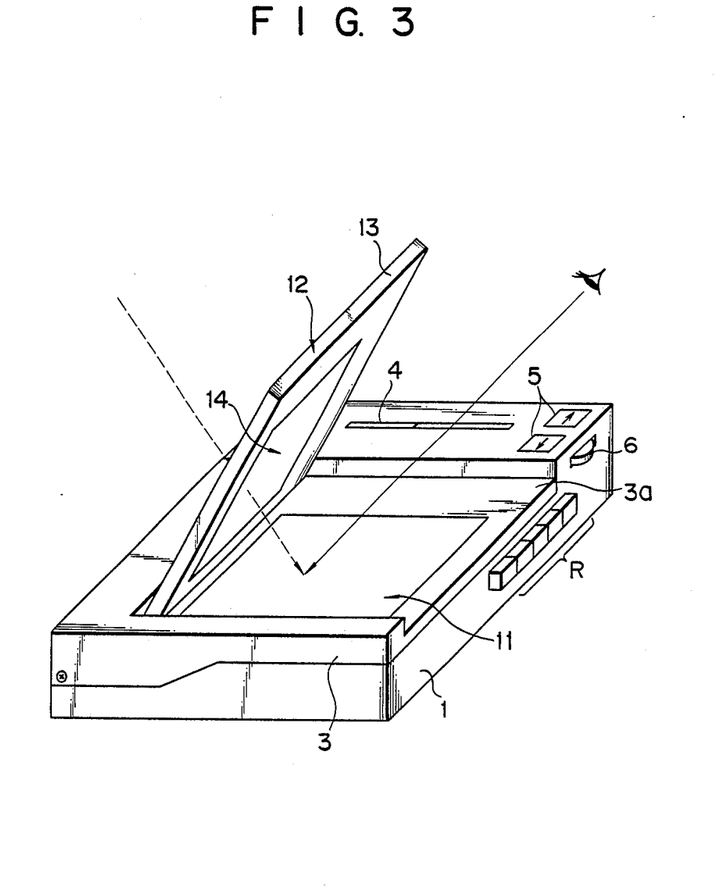
FIG. 3 is a view showing an optical path in the first embodiment of the present invention.

In main body 1, cassette loading section 2, a cassette driving device, radio and television signal receivers (neither are shown) are arranged, as shown in FIGS. 1 to 3. Cassette lid 3 for closing cassette loading section 2 to be openable/closable is mounted on the upper surface of main body 1. Radio tuning indicator 4 and television tuning switches 5 are arranged on the right side of lid 3, as shown in FIG. 1. Volume control 6 is arranged on the front surface of main body 1, and radio tuning control 7 and headphone connector 8 are arranged on the right side surface of main body 1, as shown in FIG. 1. Note that various switches R necessary for a tape recorder function are arranged on the front surface of main body 1. In the first embodiment, a radio reception function is provided in addition to the cassette tape recorder function.

Cassette tape 9 is detachably loaded to cassette loading section 2, and reel takeup shafts 2a which are fitted in reels 9a of cassette tape 9 to wind a tape are rotatably arranged on section 2. Radio tuning control 7 selects a frequency of a radio signal to be received. The frequency selected by tuning control 7 is indicated by indicator 4. Television tuning switches 5 are for selecting a frequency of a television signal. The frequency selected by switches 5 is displayed on liquid-crystal display panel 14 (to be described later), as shown in FIG. 2. Volume control 6 is for controlling a tone volume, and headphone connector 8 is for connecting headphone 10. Jack 10a of headphone 10 is detachably inserted in connector 8.

Cassette lid 3 closes cassette loading section 2 and allows loading and unloading of cassette tape 9 while it is open. Lid 3 has a flat shape, and recess 3a is formed on the upper surface of lid 3, as shown in FIGS. 2 and 3. Reflection plate 11 and openable/closable liquid-crystal display device 12 are housed in recess 3a. Liquid-crystal display device 12 displays a received television signal as an image, and comprises flat casing 13 which is housed in recess 3a of lid 3 to be openable/closable, liquid-crystal display panel 14 arranged at substantially the center of casing 13, and a liquid-crystal driving section (not shown) arranged in casing 13, as shown in FIGS. 2 and 3. More specifically, casing 13 is pivotally mounted in recess 3a of cassette lid 3 on one side thereof, so that it can be opened at a predetermined angle when lid 3 is pivoted upward. Liquid-crystal display panel 14 is of a transmission type, and is driven by the liquid-crystal display section. Reflection plate 11 reflects an image displayed on liquid-crystal display panel 14, and is arranged on a plane of the bottom surface of recess 3a.

The liquid-crystal television receiver as described above has a mode switch (not shown). A tape recorder function, a radio function, and a television function are switched by the mode switch.

A case will be described wherein the liquid-crystal television receiver having the above arrangement executes different functions.

When the receiver is used as a cassette tape recorder, the tape recorder function is selected by the mode switch. Thereafter, cassette lid 3 is opened, as shown in FIG. 1. In this state, cassette tape 9 is loaded in cassette loading section 2 of main body 1, and reels 9a of cassette tape 9 are fitted on reel takeup shafts 2a of cassette loading section 2. Cassette lid 3 is then closed, and jack 10a of headphone 10 is inserted in headphone connector 8 arranged on the right side surface of main body 1 (FIG. 1). Thereafter, a switch (not shown) on the back surface of main body 1 is operated, and volume control 6 on the front surface is operated to control a tone volume. In this way, a user can listen to information, such as music, recorded on cassette tape 9.

When the television receiver is used, the television mode is selected by the mode switch, and liquid-crystal display device 12 arranged in recess 3a of cassette lid 3 is pivoted upward to be opened at a predetermined angle while cassette lid 3 is closed, as shown in FIG. 2. In this state, tuning switches 5 arranged on the upper right surface of main body 1 are operated to select the frequency of a television signal to be received. The liquid-crystal driving section (not shown) of liquid-crystal display device 12 drives liquid-crystal display panel 14 in accordance with the signal at the selected frequency. Display panel 14 then displays an image corresponding to the received television signal. The image displayed on display panel 14 is reflected by reflection plate 11 which is arranged at the same level as the bottom surface of recess 3a of cassette lid 3, as shown in FIG. 3. More specifically, since display panel 14 is of a transmission type, external light is radiated obliquely downward from display panel 14, and reflects the image displayed on display panel 14 onto reflection plate 11 therebelow. The image reflected by reflection plate 11 can be clearly watched irrespective of a field angle characteristic that poses a disadvantage of display panel 14. For this reason, when the receiver is placed on a desk top to be viewed, this effect is prominent.

When the receiver is used as a radio, cassette lid 3 is closed to close cassette loading section 2, and liquid-crystal display device 12 is housed in recess 3a of cassette lid 3. The mode switch is set to the radio function. In this case, radio tuning control 7 is operated so as to select the frequency of a radio signal to be received. The selected frequency is indicated by indicator 4, and the radio signal can be listened to through headphone 10. In this case, the entire arrangement is rendered compact and portable. In addition, a radio broadcast can be listened to while carrying the device.

In the above embodiment, liquid-crystal display panel 14 and liquid-crystal display device 12 having the liquid-crystal driving section, which serve as a second lid, are arranged to be openably/closably fitted in the recess 3a of cassette lid 3 as a first lid. However, the present invention is not limited to this. For example, only liquid-crystal display panel 14 can be arranged on cassette lid 3 to be openable/closable, and the liquid-crystal driving section can be arranged in main body 1.

A second embodiment of the present invention will now be described with reference to FIGS. 4 to 6. In the second embodiment, reflection mirror 110a is arranged on television signal receiver 110 which is mounted in cassette loading section 102 of main body 101, and liquid-crystal display panel 103 is arranged on lid casing 111 which is mounted on main body 101. An image displayed on display panel 103 is watched while being reflected by reflection mirror 110a.

Figure 4:
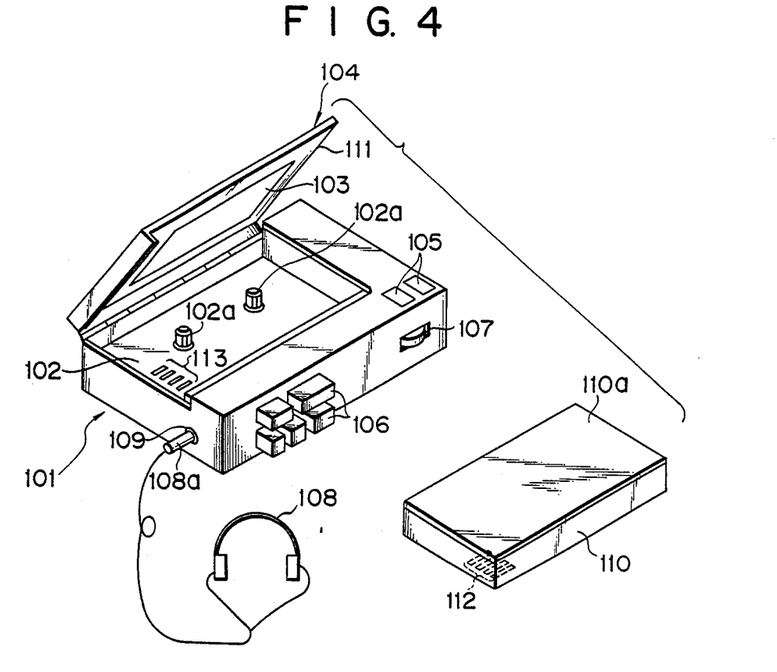
FIG. 4 is a perspective view of a main body according to a second embodiment of the present invention when a lid thereof is opened.
Figure 5:
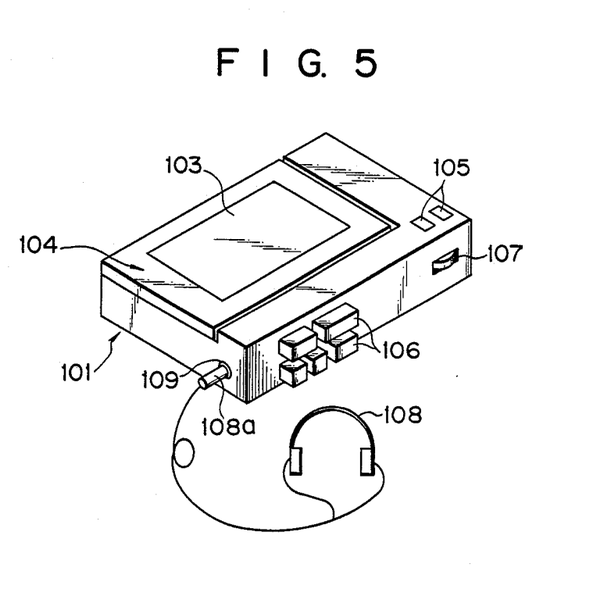
FIG. 5 is a perspective view showing a state wherein the lid of the main body according to the second embodiment of the present invention is closed.

As shown in FIG. 4, main body 101 incorporates a cassette tape driving device and a recording/reproduction device (neither are shown) in addition to cassette loading section 102. Liquid-crystal display unit 104 is arranged on the upper surface of main body 101 inside lid casing 111 for opening/closing cassette loading section 102. Tuning switches 105 for selecting a reception frequency of a television signal is arranged on the right corner of the upper surface of main body 101. Volume control 107 and push button switches 106 which are used for the tape recorder function are arranged on the front side surface of main body 101, as shown in FIG. 4. Furthermore, jack 109 which is connectable to headphone 108 is arranged on the left side surface of main body 101.

Television signal receiver 110 has substantially the same size as that of a cassette tape, and reflection mirror 110a is adhered on the upper surface thereof. Receiver 110 incorporates a bar antenna for receiving a video signal, a tuner section, a linear section, and the like. When receiver 110 is loaded into cassette loading section 102, receiver 110 is electrically connected to liquid-crystal display unit 104 and various other switches, e.g., tuning switches 105 through contacts 112 and 113. Thus, a television image can be displayed on liquid-crystal display panel 103, and an audio signal can be output through headphone 108. In this manner, since receiver 110 is arranged separately from main body 101, none of the electronic parts of the liquid-crystal display device need be arranged in the main body. This construction is advantageous in terms of compact appearance and assembly.

A cassette tape or television signal receiver 110 is detachably loaded into cassette loading section 102. Reel takeup shafts 102a for a cassette tape are rotatably arranged in cassette loading section 102. As can be seen from FIGS. 4 and 5, television tuning switches 105 are used for selecting video and audio frequencies of a television signal. When a desired frequency is selected by tuning switches 105, an image is displayed on display panel 103, and an audio signal can be listened to through headphone 108. Push button switches 106 are enabled when a cassette tape is loaded into cassette loading section 102 so as to perform recording and reproduction operations. Volume control 107 is used for controlling a tone volume. Jack 109 detachably receives plug 108a of headphone 108.

Figure 6:
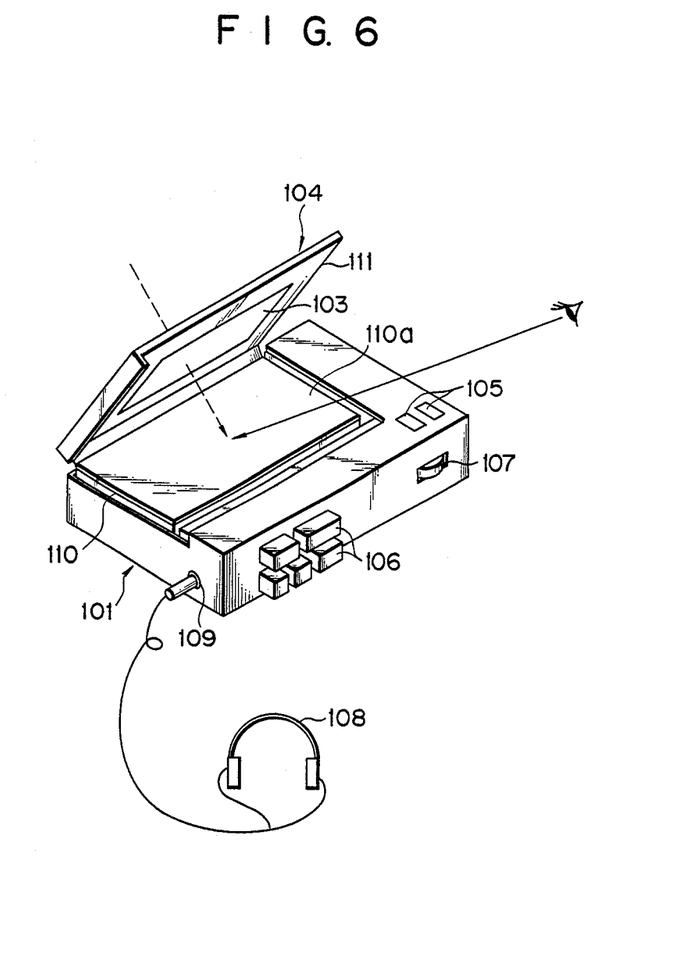
FIG. 6 is a perspective view showing a state wherein the second embodiment is used as a liquid-crystal television receiver.

Flat lid casing 111 can be opened at a predetermined angle, as shown in FIG. 6, so as to receive a cassette tape or television signal receiver 110. Liquid-crystal display unit 104 arranged on lid casing 111 comprises a liquid-crystal display panel 103 and a liquid-crystal driving circuit (not shown). Liquid-crystal display panel 103 is arranged so that an optimal image can be reflected by reflection mirror 110a.

A case will be described wherein the liquid-crystal television receiver having the above arrangement is used as a tape recorder. As shown in FIG. 4, lid casing 111 is opened, and a cassette tape (not shown) is loaded into cassette loading section 102. Lid casing 111 is then closed (FIG. 5), and plug 108a of headphone 108 is inserted in jack 109 arranged on the left side surface of main body 101. Push buttons 106 are then operated so as to reproduce information recorded on a cassette tape.

When the television receiver is used, lid casing 111 is opened to a predetermined angle, and television signal receiver 110 is loaded into cassette loading section 102, so that reflection mirror 110a faces upward, as shown in FIGS. 4 and 6. In this state, television tuning switches 105 arranged on the upper side surface of main body 101 are operated to tune a desired channel frequency. The liquid-crystal driving unit of liquid-crystal display unit 104 drives liquid-crystal display panel 103 in accordance with the tuned frequency, and an image is displayed on display panel 103. The image displayed on display panel 103 is reflected by reflection mirror 110a arranged on the upper surface of television signal receiver 110, as shown in FIG. 6. More specifically, since display panel 103 is of a transmission type, external light is radiated on display panel 103, so that the image displayed on display panel 103 is reflected by reflection mirror 110a. At this time, display panel 103 is arranged at an optimal position with respect to reflection mirror 110a by optimally setting the opening angle of lid casing 111, and a user can watch a clear image reflected by reflection mirror 110a.

A third embodiment of the present invention will now be described with reference to FIGS. 7 to 10. In the third embodiment, a liquid-crystal display panel is arranged on a lid which is pivotally mounted on a casing. A back-light device for illuminating the back surface of the display panel has the same shape as that of a cassette tape loaded to the casing, and is detachably loaded into a cassette loading section of the casing.

Figure 7:
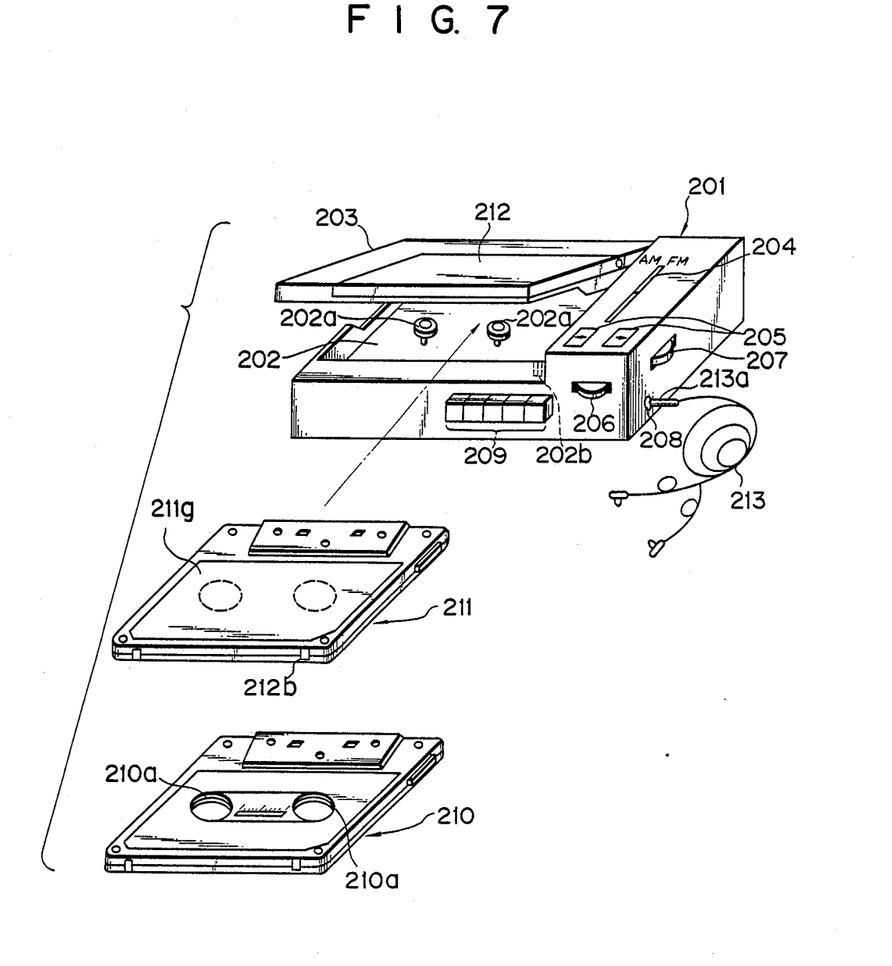
FIG. 7 is a perspective view of a main body and a tape cassette according to a third embodiment of the present invention, when the third embodiment is used as a tape recorder.

FIG. 7 shows the outer appearance of a portable liquid-crystal television receiver. The liquid-crystal television receiver has a television function, a cassette player function, a radio function, and the like. Cassette loading section 202 is arranged inside portable box-like main body 201, and a television receiver, a cassette driving device, a radio receiver, and the like (not shown) are housed in main body 201. More specifically, cassette lid 203 for opening/closing cassette loading section 202 is pivotally mounted on the upper surface of main body 201. Tuning indicator 204 for the radio function and tuning switches 205 for the television function are arranged on the upper surface on the right side of cassette lid 203 shown in FIG. 7. Volume control 206 is arranged on the front surface of main body 201, and radio tuning control 207 and headphone connecting section 208 are arranged on the right side surface. Various switches 209 necessary for the cassette player function are arranged on the front surface of main body 201.

Cassette loading section 202 detachably receives either a cassette tape 210 or a back-light device 211 (to be described later). Reel takeup shafts 202a engaged with reels 210a of cassette tape 210 are arranged in section 202 and are driven by a cassette driving device (not shown). Tuning control 207 selects a frequency of a radio signal to be received, and the frequency selected by control 207 is indicated by indicator 204 arranged on the upper surface. Tuning switches 205 also select a frequency of a television signal to be received. The frequency selected by switches 205 is displayed on liquid-crystal display panel 212 (to be described later). Headphone connecting section 208 is connected to headphone 213, in other words, detachably receives jack 213a of headphone 213.

Cassette lid 203 opens and closes cassette loading section 202, and allows tape loading/unloading when it is opened. Cassette lid 203 has a flat shape, and comprises liquid-crystal display panel 212 at a predetermined position. Liquid-crystal display panel 212 is of a transmission type for displaying a television image, and is driven by a liquid-crystal driving unit.

Figure 8:
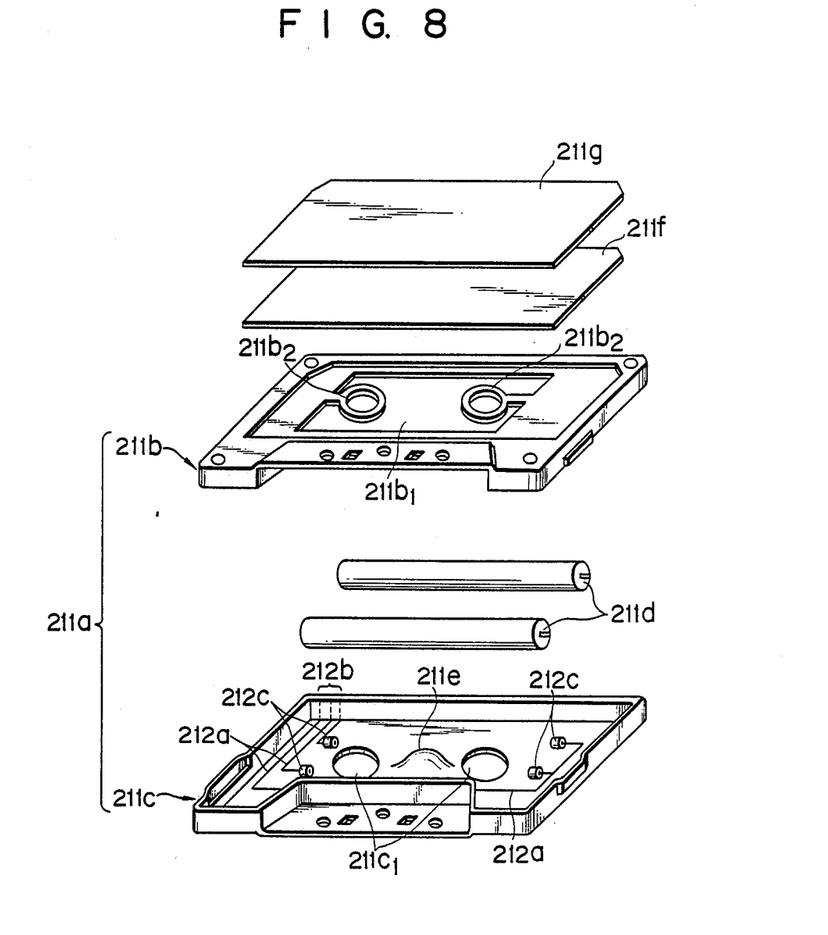
FIG. 8 is an exploded plan view of a back-light device used in the third embodiment shown in FIG. 7.
Figure 9:
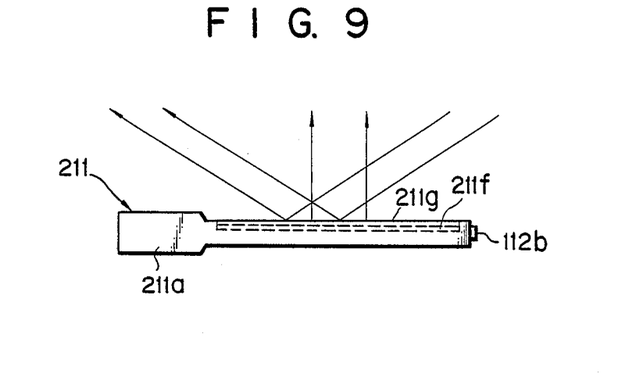
FIG. 9 is a side view of the back-light device shown in FIG. 8.

Back-light device 211 which is detachably loaded into cassette loading section 202 illuminates the inner surface of liquid-crystal display panel 212 arranged on cassette lid 203, and has the same size as cassette tape 210. Device 211 has the construction as shown in FIGS. 8 and 9. More specifically, main body 211a of device 211 comprises upper and lower casings 211b and 211c, and two parallel fluorescent tubes 211d are arranged in main body 211a. Inverted-V shaped reflection plate 211e is arranged at the center of lower casing 211c, and half mirror 211g is arranged on the upper surface of upper casing 211b via scatter plate 211f. Opening 211b1 corresponding to display panel 212 is formed on the upper surface of upper casing 211b. Scatter plate 211f and half mirror 211g are arranged to cover opening 211b1, and a pair of mounting rings 211b2 are formed integrally with two sides of opening 211b1 to extend inwardly. Mounting rings 211b2 receive reel takeup shafts 202a of cassette loading section 202. Inverted-V shaped reflection plate 211e is arranged on the bottom surface inside lower casing 211c, and two fluorescent tubes 211d are arranged thereon. Through holes 211c1 are formed in the bottom surface of lower casing 211c and reflection plate 211e in correspondence with mounting rings 211b2 of upper casing 211b. Through holes 211c1 receive reel takeup shafts 202a. Fluorescent tubes 211d serve as a light source for irradiating liquid-crystal display panel with light, and are connected to external connecting section 212b of lower casing 211c through lead wirings 212a. External connecting section 212b is connected to connecting terminal section 202b in main body 201, which is arranged on the front side surface of cassette loading section 202, when back-light device 211 is loaded to cassette loading section 202, thereby connecting fluorescent tubes 211d to a power source (not shown) in main body 201. Reflection plate 211e uniformly reflects light so as not to darken a portion between fluorescent tubes 211d, and has an inverted-V shaped central portion. Scatter plate 211f uniformly scatters light emitted from fluorescent tubes 211d, and half mirror 211g allows light from back-light device 211 to transmit therethrough, thereby radiating light to display panel 212. When a television image is watched while cassette lid 203 is opened in, e.g., daytime, half mirror 211g reflects external light toward display panel 212.

The liquid-crystal television receiver has a mode switch (not shown). The television function, the cassette player function, the radio function, and the like can be selected by switching the mode switch.

A case will be described wherein the liquid-crystal television receiver having the above arrangement is used.

Figure 10A:
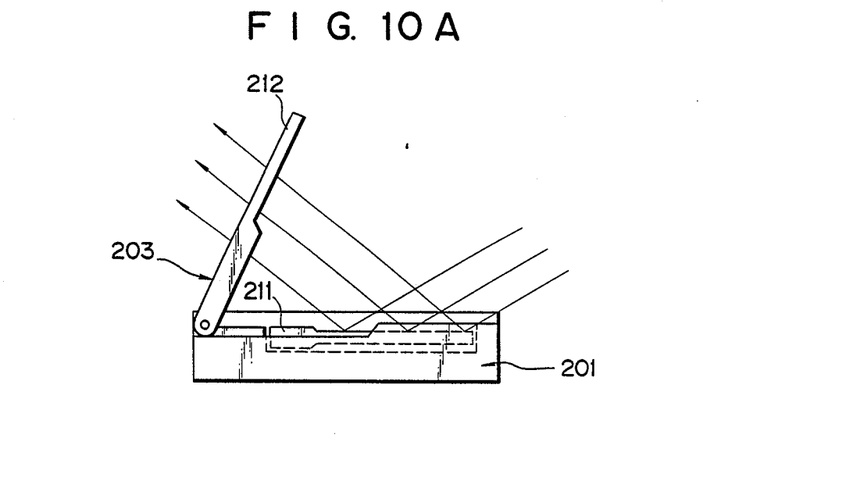
FIGS. 10A and 10B are views showing optical paths respectively when the lid of the main body shown in FIG. 7 is opened and closed.

When the television receiver is used in a bright place, e.g., outdoors, during daytime, cassette lid 203 arranged on the upper portion of main body 201 is opened, and back-light device 211 is loaded to cassette loading section 203 of main body 201, as shown in FIG. 10A. The mode switch is switched to the television function. The apparatus is entirely arranged in a predetermined direction, i.e., in a direction to make liquid-crystal display panel 212 arranged on cassette lid 203 easy to see. Then, television tuning switches 205 (FIG. 7) are selectively operated to select the frequency of a television signal to be received. Display panel 212 is driven in accordance with the signal of the selected frequency, and displays an image corresponding to the received television signal. The displayed image is reflected by half mirror 211g arranged on the upper surface of back-light device 211 and external light is radiated on the back surface side of display panel 212. Thus, if fluorescent tubes 211d of back-light device 211 are not turned on, sufficient external light is radiated on display panel 212, and a clear image can be obtained. In this case, a user can listen to a television sound by connecting headphone 213 to headphone connecting section 208. The tone volume of television sound can be controlled by operating volume control 206 (FIG. 7).

Figure 10B:
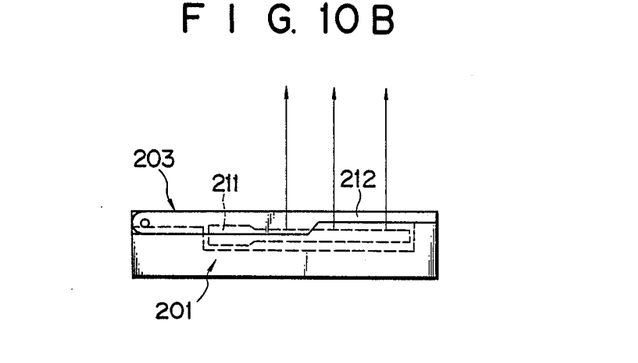

When the television receiver is used in a dark place during nighttime, back-light device 211 is loaded to cassette loading section 203 of main body 201 and cassette lid 203 is then closed, as shown in FIG. 10B. External connecting section 212b which is arranged on the outer side surface of back-light device 211 is connected to connecting terminal section 202b in cassette loading section 202. Therefore, when a switch (not shown) is operated, two fluorescent tubes 211d in back-light device 211 (FIG. 8) are turned on. Light emitted from fluorescent tubes 211d is uniformly reflected by inverted-V shaped reflection plate 211e in back-light device 211 and is then scattered by scatter plate 211f. Thereafter, the light is transmitted through half mirror 211g arranged on the upper surface of back-light device 211, and is satisfactorily radiated on the back surface (lower surface) of display panel 212. For this reason, the image on display panel 212 can be clearly watched in a dark environment.

When the cassette player function is used, cassette tape 210 is loaded to cassette loading section 202 of main body 201 in place of back-light device 211, cassette lid 203 is then closed, and the mode switch is switched to the cassette player function. Then, switches 209 (FIG. 7) arranged on the front surface of main body 201 can be operated. The cassette driving device in main body 201 drives reel takeup shafts 202a so as to rotate reels 210a of cassette tape 210, thereby reproducing information, e.g., music, recorded on the tape from headphone 213.

When the radio function is used, cassette lid 203 is closed, and the mode switch is switched to the radio function. Then, radio tuning control 207 is operated to select a frequency of a radio signal to be received. The selected frequency is indicated by tuning indicator 204, and a radio sound corresponding to the radio signal can be listened to through headphone 213.

The television receiver of the above embodiment has the cassette player function and the radio function in addition to the television function. However, the present invention is not limited to these, and the television receiver can have a VTR function, and the like.

What is claimed is:

1. A liquid-crystal television receiver in combination with a tape recorder, comprising:
   a main body including a cassette tape driving mechanism and having a cassette loading section;
   a television reception circuit means for receiving a television signal;
   a first pivotal lid pivotally coupled to said main body and adapted to cover a cassette tape when a cassette tape is loaded into said cassette loading section;
   a second pivotal lid pivotally arranged relative to said first pivotal lid;
   an optical means comprising a reflection mirror arranged on a surface of said first pivotal lid for facing said second pivotal lid; and
   a transmission type liquid-crystal display means arranged on the second pivotal lid for displaying, in cooperation with said optical means, a television image corresponding to the television signal received by said television reception circuit.

2. The liquid-crystal television receiver of claim 1, wherein said television reception circuit means is arranged inside said main body.

3. The liquid-crystal television receiver of claim 1, wherein said first and second pivotal lids are independently pivotable.

4. The liquid-crystal television receiver of claim 1, wherein said first pivotal lid has an axis of rotation parallel to an axis of rotation for the second pivotal lid.

5. The liquid-crystal television receiver of claim 4, wherein said second pivotal lid comprises means coupled to the first pivotal lid for enabling rotation of the second pivotal lid around its axis of rotation.

6. A liquid-crystal television receiver in combination with a tape recorder, comprising:
   a main body incorporating a cassette type driving mechanism and having a cassette loading section;

a television reception circuit means for receiving a television signal;

an optical means comprising a cassette member which is loadable into said cassette loading section and which has substantially the same shape as a cassette tape; and a transmission type liquid-crystal display means coupled to said main body for displaying, in cooperation with said optical means, a television image corresponding to the television signal received by said television reception circuit means.

7. The liquid-crystal television receiver of claim 6, wherein said cassette member having a light source means incorporated therein for irradiating said liquid-crystal display means with light when said cassette member is loaded into said cassette loading section of said main body.

8. The liquid-crystal television receiver of claim 7, wherein said cassette member having said television reception circuit means incorporated therein and including means for electrically connecting said television reception circuit to said main body when said cassette member is loaded into said cassette loading section of said main body.

9. The liquid-crystal television receiver of claim 7 wherein said optical means further comprises a half mirror on a surface thereof facing said liquid-crystal display means when said cassette member is loaded into said cassette loading section of said main body.

10. The liquid-crystal television receiver of claim 7, wherein said cassette member further comprises a scatter plate on a surface thereof facing said liquid-crystal display device when it is loaded into said cassette loading section of said main body.

11. The liquid-crystal television receiver of claim 7, wherein said light source of said cassette member comprises fluorescent tubes, and an inverted-V shaped reflection plate for uniformly reflecting light from said fluorescent tubes.

12. The liquid-crystal television receiver of claim 6, wherein said optical means comprises a reflection mirror;

said reflection mirror being arranged on a surface of said cassette member facing said liquid-crystal display means when said cassette member is loaded into said cassette loading section for reflecting a television image displayed on said liquid-crystal display means.

* * * * *